A. S. JOHNSON.
SHOCK ABSORBER.
APPLICATION FILED JULY 12, 1916.
1,210,483.
Patented Jan. 2, 1917.
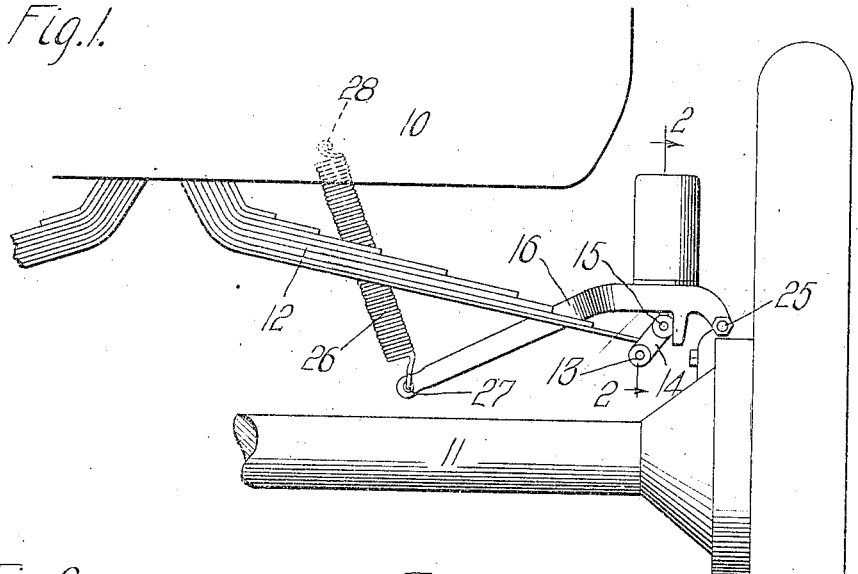
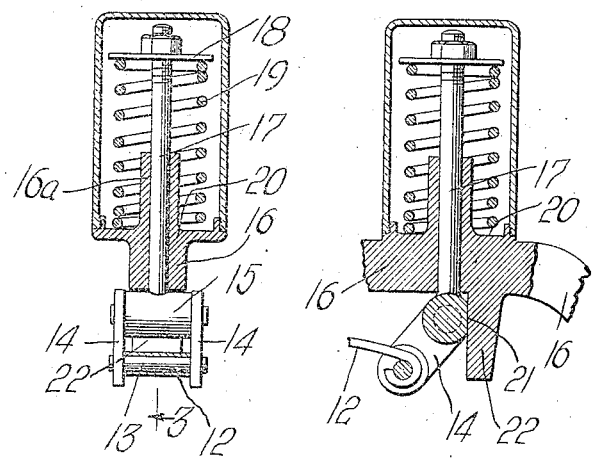
Inventor
Albert S. Johnson,
by
his Attorney.

UNITED STATES PATENT OFFICE.

ALBERT S. JOHNSON, OF SAN DIEGO, CALIFORNIA.

SHOCK-ABSORBER.

1,210,483.  Specification of Letters Patent.  Patented Jan. 2, 1917.

Application filed July 12, 1916. Serial No. 108,865.

*To all whom it may concern:*

Be it known that I, ALBERT S. JOHNSON, a citizen of the United States, residing at San Diego, in the county of San Diego, State of California, have invented new and useful Improvements in Shock-Absorbers, of which the following is a specification.

This invention relates to shock absorbers of that class which are adapted to interpose between the springs and the running gear of a vehicle; and it is an object of this invention to provide an improved shock absorber of this class with means for absorbing the smaller vibrations before they are transmitted to the vehicle spring and thence transmitted to the vehicle body.

The general nature of my invention will be best understood from the following description of a preferred specific form of device embodying my invention. I illustrate such a preferred and specific form of device in the accompanying drawings in which—

Figure 1 is an elevation showing my improved shock absorber applied to a vehicle, Fig. 2 is an enlarged section taken as indicated by line 2—2 on Fig. 1, and Fig. 3 is a section taken as indicated by line 3—3 on Fig. 2.

In the drawings the numeral 10 designates the body of a vehicle and 11 the axle thereof, forming a part of the running gear of the vehicle. The position and nature of the attachment of my device of the running gear and vehicle will, of course, depend upon the position and nature of the springs of the vehicle. In the present case I have illustrated the application of my improved shock absorber to a vehicle having supporting springs 12 which are arranged directly over the axle 11. The end of the spring 12 is connected at 13 with a pair of links 14 which in turn connect with a trunnion 15. This trunnion, instead of being connected directly to the lever 16 as is usually the case, connects to a vertical rod 17 which passes upwardly through the lever 16, having a long sliding bearing in the lever and in a boss 16ª extending upwardly therefrom. This rod has a disk 18 adjustable at its upper end, and a spring 19 is confined between disk 18 and a seat 20 on the lever 16. The rod 17 preferably has a close sliding fit in its passage through the lever 16 and the trunnion 15 may have a flat face 21 which bears against the vertically extending lug 22, to prevent the trunnion from turning or twisting out of position.

The outer end of the lever 16 is pivoted at 25 to the running gear of the machine; while a spring 26 connects at 27 to the inner end of the lever, the other end of the spring being connected at 28 to the body of the vehicle. The resiliency of the spring 19 is so determined that, when the vehicle is passing over ordinarily smooth road, the small vibrations, which would otherwise be transmitted to the vehicle spring 12 and thence to the body, will be taken up by the spring 19. When the wheel 30 tends to suddenly rise the end 25 of lever 16 is moved upwardly; and that part of the lever and spring seat 20 are moved upwardly, compressing the spring 19 before the end of the spring 12 begins to move upwardly, or before the spring 26 begins to lengthen. In addition, this spring 19 also performs a function in conjunction with the spring 26 when large vibrations are encountered; but the primary function of the spring 19 is to absorb ordinary small vibrations which are not sufficiently large to call the spring 26 into immediate action and which, consequently, would otherwise be transmitted to the vehicle spring 12 and thence to the body of the vehicle.

Having described a preferred form of my invention, I claim:

1. In combination with a vehicle running gear and body and suspension spring therefor, a lever pivoted to the running gear, a resilient connection between the lever and the body, and a resilient connection between the suspension spring and the lever.

2. In combination with a vehicle running gear and body and suspension spring therefor, a lever pivoted at one end to the running gear, a resilient connection between the other end of the lever and the body, and a resilient connection between the suspension spring and the lever intermediate its ends.

3. In combination with a vehicle running gear and body and suspension spring therefor, a lever pivoted at one end to the running gear, a resilient connection between the other end of the lever and the body, and a connection between the suspension spring and the lever intermediate its ends embodying a compression spring seated upon the lever, a vertical rod having a sliding bearing in the lever and carrying a member at its upper end bearing down on the compression spring, and a link connection between the lower end of the vertical rod and the end of the suspension spring.

4. In combination with a vehicle running gear and body and suspension spring therefor, a lever pivoted at one end to the running gear, a resilient connection between the other end of the lever and the body, and a connection between the suspension spring and the lever intermediate its ends embodying a compression spring seated upon the lever, a vertical rod having a sliding bearing in the lever and carrying a member at its upper end bearing down on the compression spring, and a link connection between the lower end of the vertical rod and the end of the suspension spring, said vertical rod carrying a cross trunnion at its lower end to which the links are attached and said cross trunnion adapted by bearing up against the lower side of the lever to limit the upward movement of the rod.

In witness that I claim the foregoing I have hereunto subscribed my name this 29th day of June 1916.

ALBERT S. JOHNSON.

Witnesses:
JAMES T. BARKELEW,
M. P. BLAEMIRE.